UNITED STATES PATENT OFFICE.

OSCAR NASTVOGEL AND FRIEDRICH REINGRUBER, OF ELBERFELD, GERMANY, ASSIGNORS TO THE FARBENFABRIKEN, VORMALS FR. BAYER & CO., OF SAME PLACE.

BLUE DYE.

SPECIFICATION forming part of Letters Patent No. 517,473, dated April 3, 1894.

Application filed November 11, 1893. Serial No. 490,675. (Specimens.) Patented in France October 27, 1891, No. 217,020; in England November 4, 1891, No. 19,062; in Italy December 22, 1891, XXVI, 30,987, and LX, 477, and in Austria-Hungary October 9, 1892, No. 2,742 and No. 2,689.

*To all whom it may concern:*

Be it known that we, OSCAR NASTVOGEL and FRIEDRICH REINGRUBER, chemists and doctors of philosophy, subjects of the Emperor of Germany, (assignors to the FARBENFABRIKEN, VORMALS FR. BAYER & CO., of Elberfeld,) and residing at Elberfeld, Prussia, Germany, have invented a new and useful Improvement in the Manufacture of Blue Coloring-Matter, (for which the FARBENFABRIKEN, VORMALS FR. BAYER & CO., have obtained Letters Patent in France, No. 217,020, dated October 27, 1891; in England, No. 19,062ᴬ, dated November 4, 1891; in Austria-Hungary, tom. 42, fol. 2,742, and tom. 26, fol. 2,689, dated October 9, 1892; in Italy, Vol. XXVI, No. 30,987, and Vol. LX, No. 477, dated December 22, 1891,) of which the following is an exact and clear description of our invention.

Our invention relates to the production of new coloring-matter of the diphenylnaphthylmethane series by combining equal molecular proportions of tetramethyldiamidobenzhydrol and ethyl alpha naphthylamine, transforming the thus obtained leuco compound which has the formula:

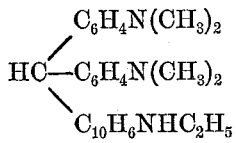

into its so called nitrosoamine derivative by means of nitrous acid and oxidizing the nitrosoamine compound of the formula:

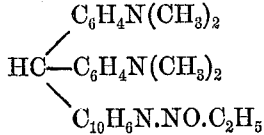

and subsequently splitting off or separating the nitroso group.

In carrying out our invention practically, we proceed as follows: 2.7 kilos, by weight, of tetramethyldiamido-benzhydrol and 1.7 kilos, by weight, of ethyl alpha naphthylamin are dissolved in ten kilos, by weight, of warm alcohol; 0.6 kilos, by weight, of glacial acetic acid are added and the solution thus obtained is heated with continuous stirring for some hours on the water-bath. After a short time almost colorless crystals begin to separate which represent the aforesaid leuco compound. When the formation of crystals ceases the condensation is complete, the mixture is cooled down, the crystalline mass is filtered off, pressed and dried. In order to convert the said leuco compound into the nitrosoamine, 4.23 kilos by weight, of the aforesaid leuco base are dissolved without heating in six kilos, by weight, of acetic acid (seventy-five per cent.) with the addition of five kilos, by weight, of hydrochloric acid (24° Baumé). A solution prepared by dissolving 0.7 kilos, by weight, of sodium nitrite in seven liters of water after cooling is allowed to flow into the above well stirred solution of the leuco base in diluted acetic and hydrochloric acid. The resulting mixture containing the formed nitrosoleuco compound is advantageously treated at 11° centigrade and then oxidized at this temperature by adding on continually stirring sixteen kilos, by weight, of a lead dioxide paste (fifteen per cent.) to the above nitroso compound. The resulting liquid of a deep green color contains the nitroso compound of the new dye-stuff.

In order to separate the nitroso group a current of sulphurous acid is allowed to pass through the above mixture, which is slowly heated at about 50° centigrade, while seven kilos, by weight, of hydrochloric acid (24° Baumé) are allowed to run slowly into the above mixture. (Of course, the separation of the nitroso group can be effected by employing other reducing agents such as sulphureted hydrogen or other agents producing the same effect.) The reaction is finished when two subsequent test portions taken out from the mixture exhibit no more a change in color after the addition of water. The lead chloride is filtered off, and five hundred liters of hot water are added to the resulting filtrate. The dye-stuff separates as a bright greenish-powder and, when the separation is complete, it is filtered off, washed out with cold water and purified, if necessary, by redissolving in hot water, allowing the dye-stuff to crystallize, filtering off, pressing and drying. We have found that the same product can also be obtained by the condensation of tetramethyldiamidobenzophenone with ethyl alpha naphthylamin in presence of oxychlorid of phosphorus or other condensing agents producing the same result. The new dye-stuff has the following composition:

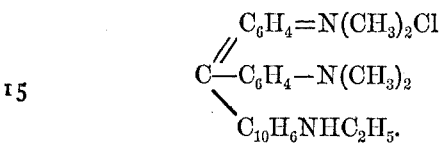

It forms a greenish-brown crystalline powder with bronze-like luster. It is almost insoluble in cold water, more soluble in water in the presence of diluted acetic acid, easily soluble in hot water with a reddish-blue color, easily soluble in alcohol with a deep blue color. When its hot solutions in water are mixed with a very small quantity of diluted mineral acid the coloring-matter separates, on the addition of a great excess of mineral acid the color of the solution is changed at first into greenish, then into greenish-yellow. Concentrated sulfuric acid (66° Baumé) dissolves it with a yellowish-brown color, and on adding water to this acid solution at first a yellow, then a green liquid results, and finally bright greenish crystals are separated. On the addition of sodium carbonate or soda-lye to its watery solutions the base of the dye-stuff is precipitated as a darkish-brown flaky mass. The coloring-matter produces on wool or on cotton prepared with tannic acid or the like beautiful clear blue shades which are brighter and somewhat more reddish than those produced by the coloring-matter known in commerce as "Victoria Blue B," referred to in Patent No. 496,435, dated May 2, 1893. A similar result is obtained, if instead of tetramethyldiamidobenzhydrol tetraethyldiamidobenzhydrol is condensed with ethyl alpha naphthylamin, or if instead of ethyl alpha naphthylamin methyl alpha naphthylamin is condensed with tetramethyldiamidobenzhydrol or tetraethyldiamidobenzhydrol and if the respective leucocompound is oxidized in the manner hereinbefore defined.

Having now described our invention and in what manner the same is to be performed, what we claim as new, and desire to secure by Letters Patent, is—

1. The process of producing new diphenylnaphthylmethane dyes by condensing equal molecular proportions of tetraalkyldiamidobenzhydrol and ethyl alpha naphthylamin (or methyl alpha naphthylamin) converting the so formed leuco compound into the nitrosoamin, oxidizing the latter and subsequently splitting off the nitroso group by treating with reducing agents.

2. As a new article of manufacture, the diphenylnaphthylmethane dyes, having the general formula:

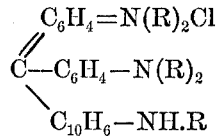

(in which formula R signifies fatty alkyl radicles such as methyl or ethyl), forming a greenish-brown crystalline powder, easily soluble in hot water with a reddish-blue color, soluble in concentrated sulfuric acid (66° Baumé) with a yellowish-brown color, which on the addition of water is changed at first into yellow, then into green, little crystals being finally separated, producing on wool or on cotton prepared with tannic acid or the like beautiful blue shades.

In testimony whereof we have signed our names in the presence of two subscribing witnesses.

OSCAR NASTVOGEL.
FRIEDRICH REINGRUBER.

Witnesses:
WILLIAM ESSENWEIN,
F. H. STRAUSS.